W. R. TUTTLE.
DISPENSING MACHINE.
APPLICATION FILED AUG. 17, 1917.
1,393,589.
Patented Oct. 11, 1921.
7 SHEETS—SHEET 4.
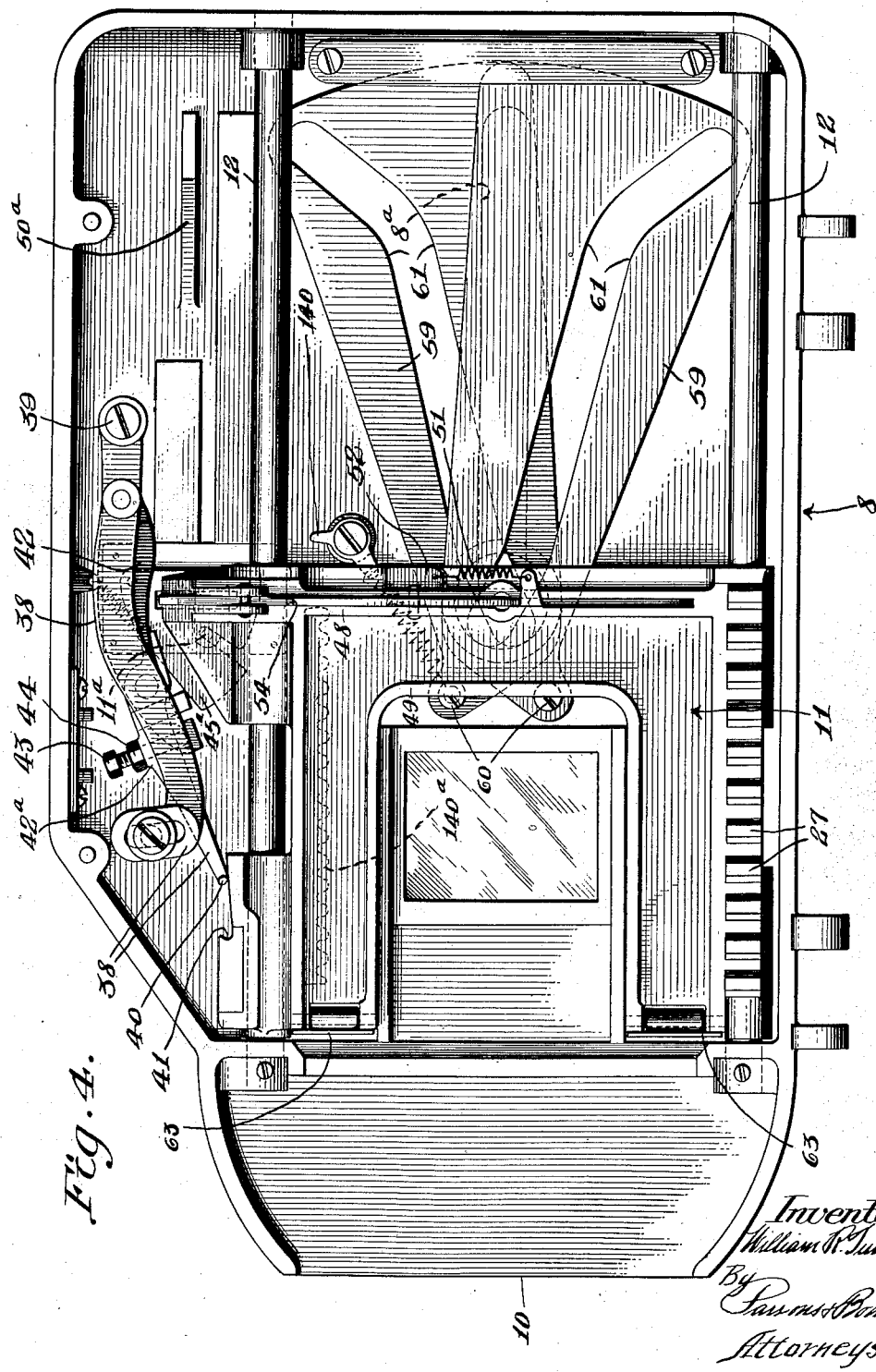

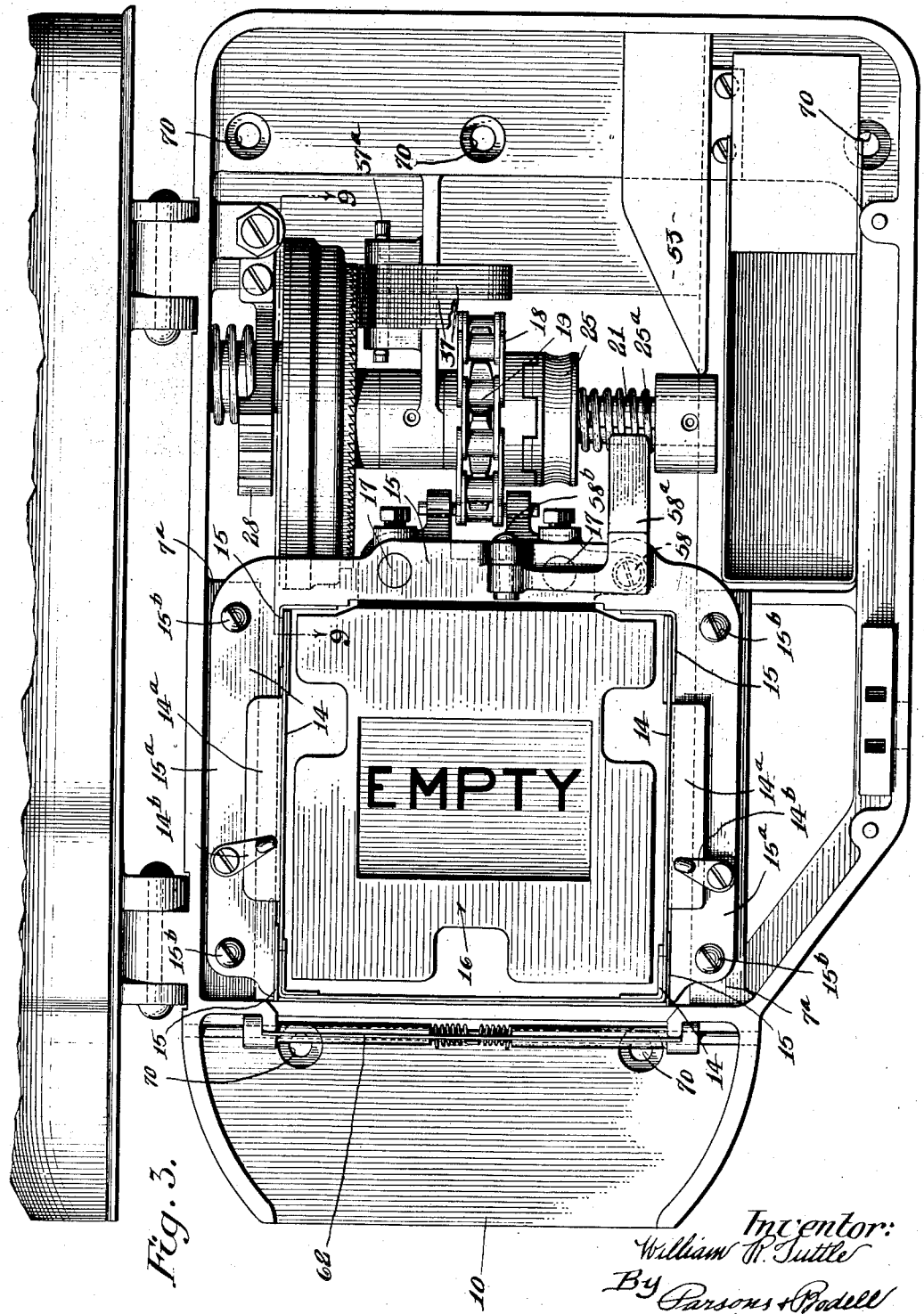

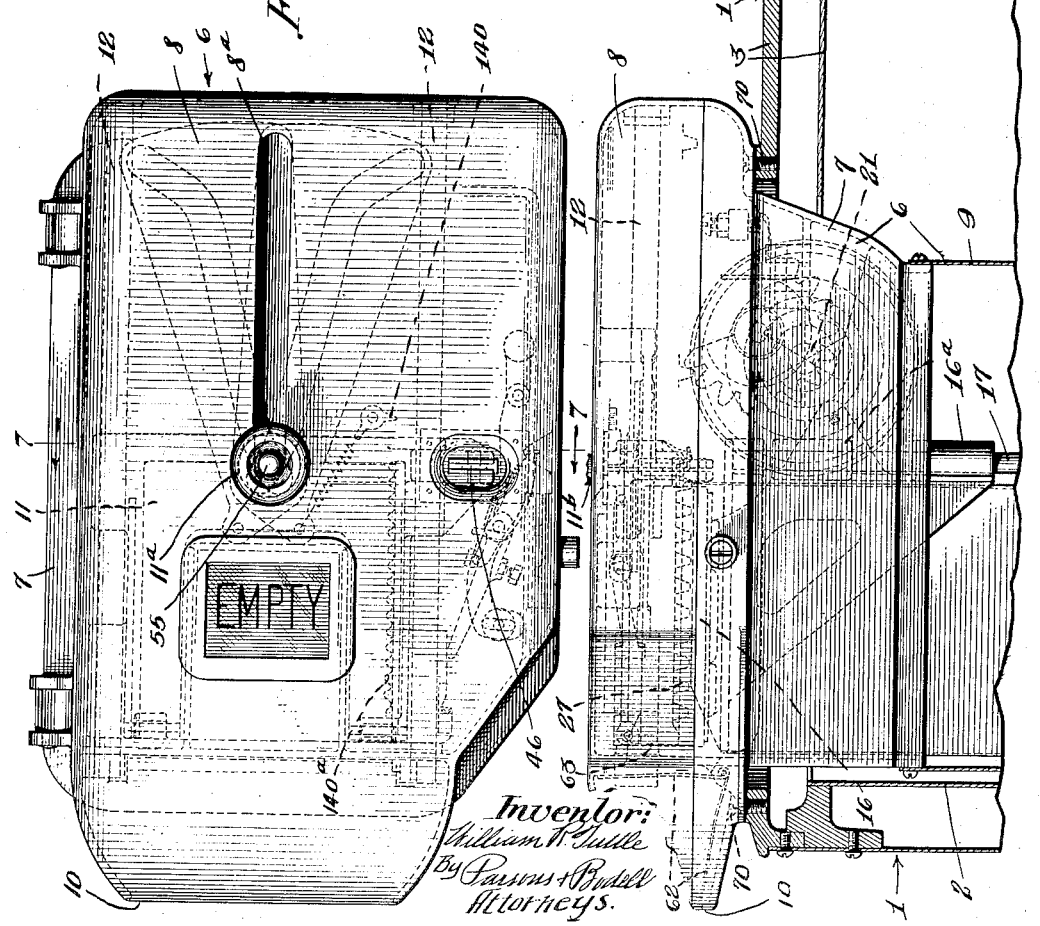

W. R. TUTTLE.
DISPENSING MACHINE.
APPLICATION FILED AUG. 17, 1917.

1,393,589.

Patented Oct. 11, 1921.

Inventor:
William R. Tuttle
By Parsons & Prodell
Attorneys.

W. R. TUTTLE.
DISPENSING MACHINE.
APPLICATION FILED AUG. 17, 1917.

1,393,589.

Patented Oct. 11, 1921
7 SHEETS—SHEET 7.

Inventor:
William R. Tuttle
By Parsons + Bodell
Attorneys.

UNITED STATES PATENT OFFICE.

WILLIAM R. TUTTLE, OF ROCHESTER, NEW YORK.

DISPENSING-MACHINE.

1,393,589. Specification of Letters Patent. Patented Oct. 11, 1921.

Application filed August 17, 1917. Serial No. 186,700.

*To all whom it may concern:*

Be it known that I, WILLIAM R. TUTTLE, a citizen of the United States, residing at Rochester, in the county of Monroe and State of New York, have invented a certain new and useful Dispensing-Machine, of which the following is a specification.

This invention has for its object a dispensing machine especially applicable for dispensing sandwiches and articles of food, which machine is particularly simple in construction and highly efficient and durable in use: and the invention consists in the combinations and constructions hereinafter set forth and claimed.

In describing this invention, reference is had to the accompanying drawings in which like characters designate corresponding parts in all the views.

Fig. 3 is a plan view of one of the mechanisms, the cover of the casing being raised.

Fig. 4 is an inner face view of the cover of one of the casings.

Fig. 5 is a transverse sectional view on line 5—5, Fig. 1.

Fig. 6 is an enlarged plan view of one of the casings.

This dispensing machine comprises a casing, a movable dispensing member in the casing, a magazine for the articles to be dispensed, mechanism for feeding the articles from the magazine to a position in front of the dispensing member, power transmitting connections between the dispensing member and said mechanism whereby upon the movement of one, the motion thereof is transmitted to the other of the connected parts, coin mechanism, and controlling means carried by the dispensing member and coacting with coin mechanism through the medium of the coin.

In this embodiment of my invention, a plurality of four units, each including a casing and parts therein, are shown as located in the container.

Figure 1:
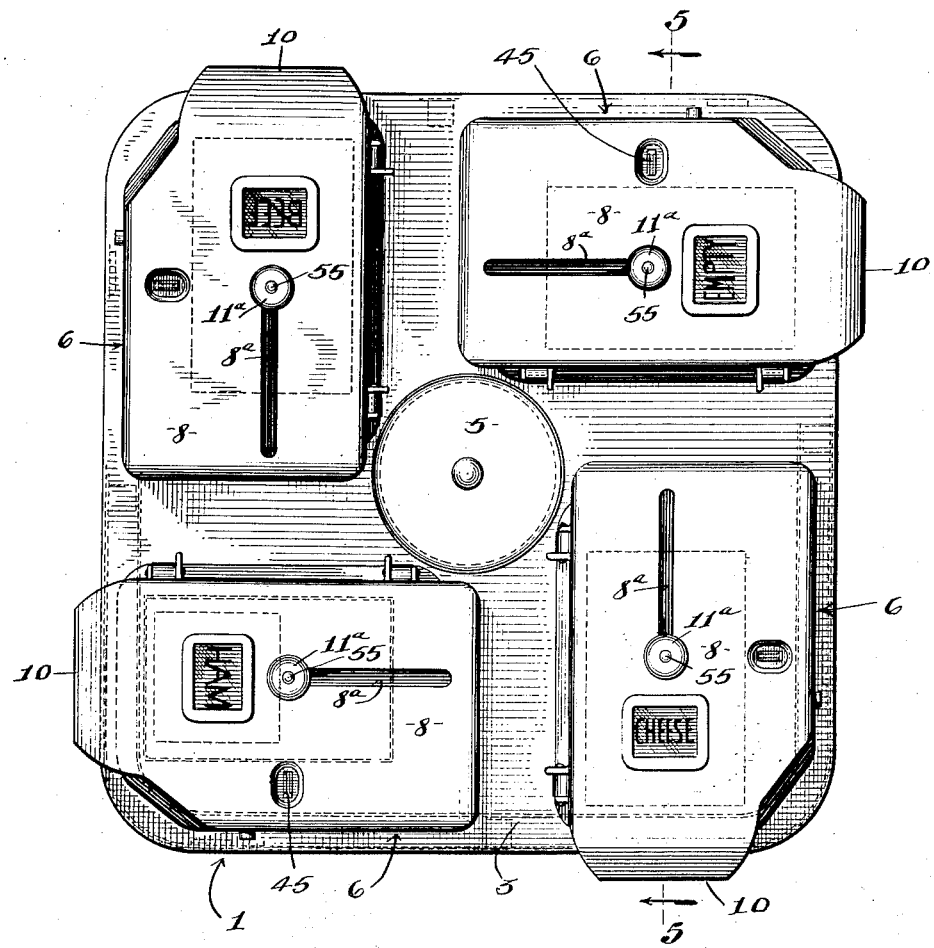
Figures 1 and 2 are respectively a plan and elevation of a machine embodying my invention.
Figure 2:
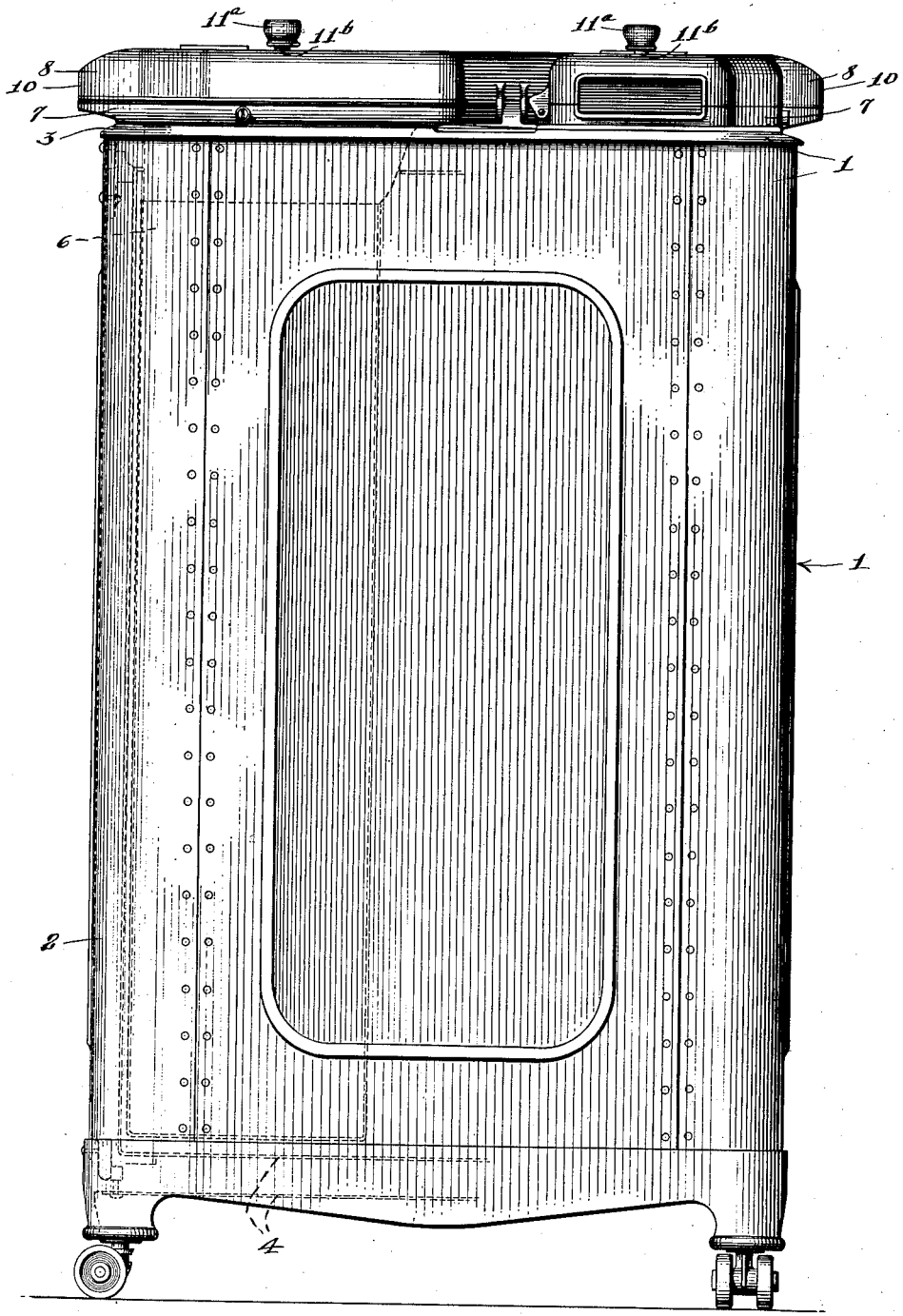

1 designates the container or receptacle which is here shown as including outer hollow sides, top and bottom 2, 3 and 4, Figs. 2 and 5, which form air or heat insulating spaces.

The container has a cover 5 located centrally thereof for permitting ice to be placed in the container about the units.

Each unit comprises a casing 6 including a body 7, a hinged cover 8 therefor, and a box-like leg portion 9 depending from the body, a magazine, a magazine support, and dispensing mechanism. Each casing is fixed in an opening in the top 3 and is removable as a whole from the container. As here shown, the container is provided with four units, the covers 8 of which are exposed on the top of the container, the mouths or discharge openings 10 of these units being exposed on the four lateral sides of the container. The bodies 7 are secured to the top wall of the container by screws extending through holes 70 in the body and into the top of the container.

11 designates the movable dispensing member of each unit and as here shown said member is reciprocally movable in the cover 8 along guides as rods 12 carried by the cover, said member being movable toward and from the exit opening 10 of the casing which exit is located partly in the body 7 and partly in the cover 8. The member 11 has a handle 11$^a$ mounted on a stud 11$^b$ extending through a slot 8$^a$ in the cover 8.

14 is the magazine which, as here shown is skeleton in form, and slidably fits into angle iron guides 15 extending lengthwise of the leg portion 9 of the casing, the magazine 14 being removable upwardly from the guides 15 upon the opening of the cover 8. The magazine is provided with laterally extending flanges 14$^a$ at its top, Fig. 3, provided on horizontal frame parts connecting the upper ends of the vertical angle iron corner strips of the magazine which flanges lap the top plate 15$^a$ on the upper ends of the guides 15. The plate is secured to internal flanges 7$^a$ of the body 7 by screws 15$^b$. The magazine 14 is locked in the guide 15 by suitable means as buttons 14^b pivoted to the top plate and movable over said flanges 14^a.

The means for feeding the articles from the magazine comprises the follower 16 having a bearing 16^a movable along vertical guide rods 17 extending lengthwise of the leg 9 of the casing, means for elevating the follower during each operation of the dispensing member 11, and means for actuating the former means.

The means for lifting the follower, in this form of my invention, comprises a sprocket chain 18 running over sprocket wheels 19 and 20 mounted, respectively, on a shaft 21 in the body 7 and on a shaft 22 carried by a bracket 23 carried at the lower end of the guide 15 for the magazine 14, the chain being connected to the follower.

The sprocket wheel 19 is here shown as loosely mounted on the shaft 21 and as connected thereto by a spring-pressed clutch section 25 slidable axially on the shaft 21.

The lower end of the magazine is open to permit the follower 16 to enter the magazine. Said magazine terminates short of the bottom of the guides 15 to permit the follower to move below the magazine, and rests on lugs 14^c. The magazine is also provided with lugs 14^d for supporting the sandwiches when the follower is below the magazine, said lugs not being long enough to obstruct the movement of the follower.

In operation, the magazine 14 is removed by sliding it upwardly out of the guides 15 upon the opening of the cover 8, and the moving of the buttons 14^b out of engagement with the flanges 14^a. The magazine may then be filled, the sandwiches resting on the lugs 14^d. The follower is then moved to the bottom of the guide 15 upon the lugs 14^c by shifting the clutch 25 by hand against the action of its spring 25^a. The filled magazine is then replaced, and upon the first operation of the dispensing member the follower lifts the sandwiches one step.

The shaft 21 is actuated from the dispensing member during a part of the movement of said member and remains inactive during the remaining part of the movement of said member, and, as here shown, the shaft is actuated during the initial part of the movement of the member 11, that is, during the first half of its reciprocation and is not actuated during the remaining or last half of the reciprocation of the member 11.

Figure 9:
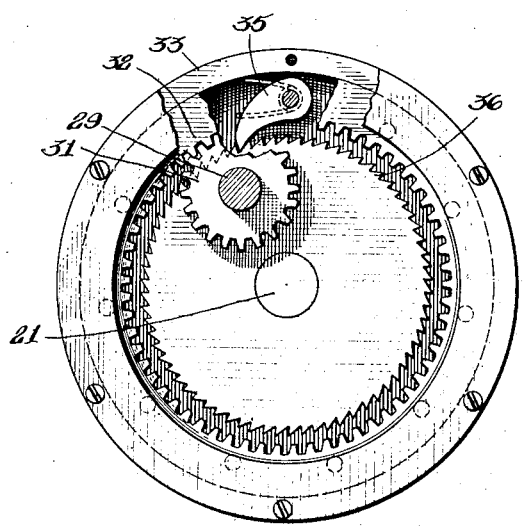
Fig. 9 is an enlarged sectional view on line 9—9 Fig. 3.

As here shown, the connections between the dispensing member and the shaft 21 include a rack 27 located on one side of the dispensing member 11 and meshing with the segment gear 28 mounted on a stud or spindle 29 supported in a boss 30 on the interior of the body 7, a pinion 31, Fig. 9 mounted on the spindle 29 and meshing with the rack 32 rotatable in the annular flange of a disk 33 having a hub 34 keyed on the shaft 21 to rotate therewith, a pawl 35 carried by the rack 32, and a ratchet wheel 36 fixed to the disk 33 and with which the pawl coacts.

In operation, during the movement of the dispensing member rearwardly from its starting position, the rack 27 turns the segment 28 rotating the pinion 31 to the left Fig. 9 and thereby moving the internal annular rack 32 likewise to the left so that the ratchet wheel 36 turns relatively to the pawl 35 and disk 33 and hence sufficient motion is transmitted to the shaft 21 to feed an article or sandwich into the receiver or in front of the dispensing member 11.

During the return movement of the dispensing member 11, the motion of the segment 28 causes the pinion 31 to turn to the right, Fig. 9, returning the annular rack 32 to its initial or starting position. The disk 33 and the ratchet wheel 36 fixed thereto are held from retrograde movement by pawls 37 suitably pivoted at 37^a to the body 7 and coacting with radial teeth on the disk 33. The pawl 35 mounted on the annular rack ratchets over the teeth of the ratchet wheel 36.

Incomplete operation of the dispensing member 11 in either direction is prevented by a reversing pawl 140, Fig. 4, carried by the cover and coacting with a rack 140^a on the dispensing member 11.

Movement of the dispensing member is normally prevented by a locking member which is movable out of operative position by a coin inserted through the coin slot in the cover 8.

38 is the locking member which is here shown as pivoted at 39 to the under side of the cover 8 and as having its end 40 remote from its pivot arranged in the path of a shoulder 41 on the movable dispensing member 11.

The member 38 is provided with a part 42 pivotally mounted thereon and adjustable on its pivot toward and from the coin receiver, to be described, in order to adjust the machine to different coins, the part 42^a being adjusted by a set screw 43 and held in its adjusted position by a clamping nut 44. Obviously, the locking member 38 prevents movement of the member 11 and will be pushed out of its locking position by a coin of the proper diameter when inserted through the coin slot 45 in the top of the cover 8. As here shown, the dispensing member 11 is provided with a coin receiver 46 having an abutment 47 opposite to the locking member 38 and located a certain distance therefrom, the adjustment of the locking member 38 being toward and away from this abutment 47.

The coin is held in the receiver by means of a movable bottom or abutment 48 carried by the dispensing member 11 and closing the lower end of the receiver 46, said abutment 48 being movable out of alinement with the receiver 46 during the movement of the dispensing member. It is also movable at will into the receiver for the purpose of dislodging the coin therein out through the coin slot 45. As here shown, the abutment 48 extends transversely of the dispensing member 11 and is slidable relatively thereto and also pivotally movable by hand relatively thereto.

As here illustrated, this abutment is in the form of a lever pivoted to the dispensing member by a pivot 49 extending through an elongated slot 50 in the lever, the lever being held in its normal position by its spring 51 connected at one end to a lug 52 on the dispensing member 11, and at its other end to a lug on the lever. The lever is moved crosswise of the dispensing member 11 by means of a cam 53, Fig. 3 fixed to the inner side of the cover and arranged in the path of a shoulder 54, Fig. 7 on the abutment 48.

The lever is tilted on its pivot to move its free end into the coin receiver 46 and remove the coin therefrom out through the coin slot, or in position to obstruct the entrance of the coin, as when the magazine is empty. The first of these pivotal movements is effected by means of a push button 55 arranged in the handle of the dispensing member 11 and movable downwardly against a spring 56, and having its lower end resting on the upper edge of the abutment 48. The second of these movements is effected by an adjustable shoulder as a screw 58, Figs. 3, 7 and 8 mounted on the follower 16 and arranged to engage the lower side of the lever $58^a$ pivoted at $58^b$ to the top plate $15^a$ of the magazine guide, and movable upwardly by said screw 58 to engage the lower side of the lever 48 in front of its pivot. The screw 58 is adjustable to regulate the device to different thicknesses of sandwiches.

Obviously, during the movement of the push button 55, the free end of the lever 48 will move into the coin receiver so that the coin cannot be inserted in the slot 45, and during the last feeding movement of the follower 16, the screw 58 will engage the lever $58^a$ and said lever will engage the lower side of the abutment and lift the free end thereof into the receiver 46 so that a coin cannot be inserted therein.

Figure 10:
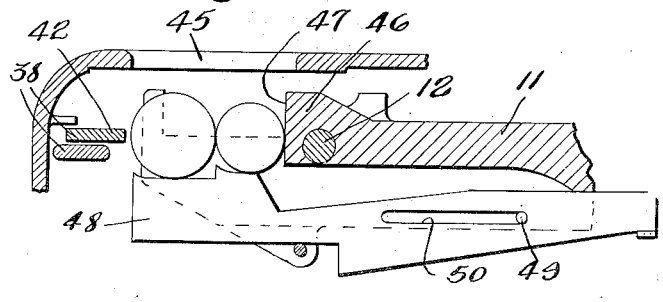
Fig. 10 illustrates a modified form of the coin controlling mechanism.

This coin receiver can be readily adapted to be operated by a plurality of coins, wherein the combined coins operate the locking member 38 as seen in Fig. 10, the distance between the abutment 47 and the locking member 38 being such that coins of predetermined diameters when lying edgewise against each other, fill the coin space.

Figure 7:
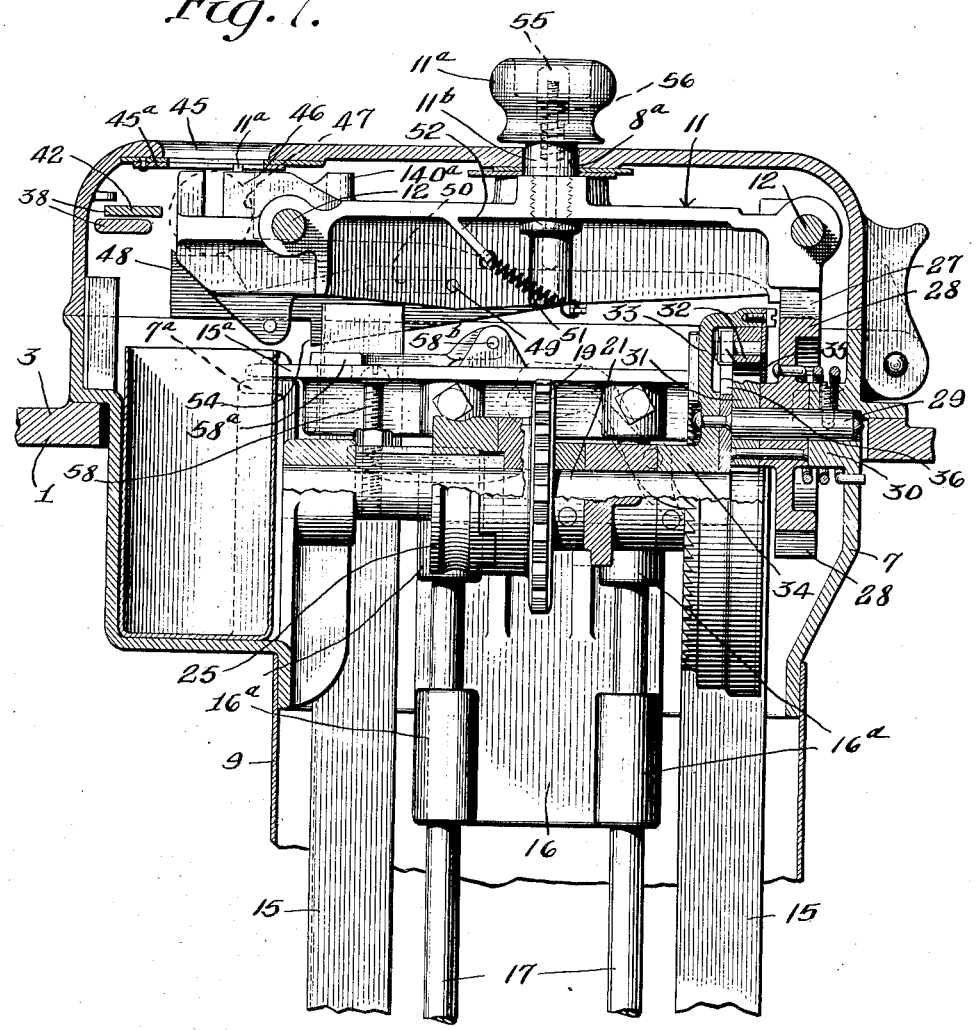
Fig. 7 is a transverse sectional view taken on the plane of line 7—7, Fig. 6 looking to the left.
Figure 8:
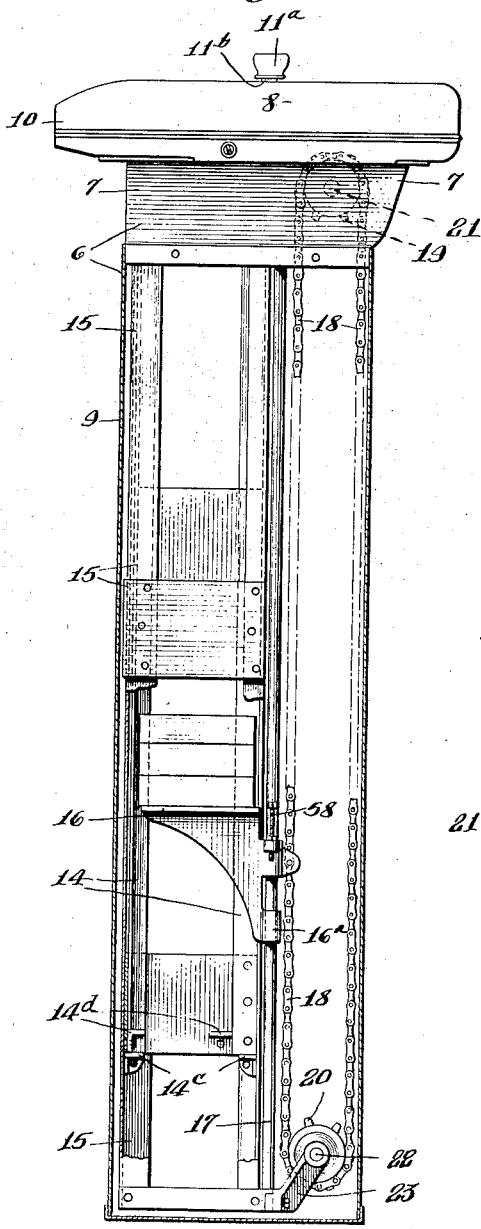
Fig. 8 is a detail view, partly in section, of one of the units.

The coin slot 45 is closed when the receiver is out of alinement therewith by a closure $45^a$, Figs. 4 and 7 pivoted to the cover and operated by the dispensing member 11, the closure being here shown as pivoted at 45 to the cover and as having a slot which receives a pin $11^a$ on the dispensing member.

The coin is removed from the receiver and falls into a suitable receptacle in the body, by a cam $50^a$ arranged on the inner side of the cover in position to engage the coin as the dispensing member nears the end of its outward throw and the abutment 48 has been moved laterally by the cam 50 against the action of the spring 51.

The slot $8^a$ in which the shank $11^b$ of the handle $11^a$ moves, is closed by means of cover plates 59 pivoted at 60 to the under side of the cover 8 and having cam slots 61 through which the shank extends, these plates lapping each other and their slots intersecting at the point the shank extends therethrough so that the slot of the cover 8 is always closed.

The mouth of the receiver is closed by a spring-pressed flap or door 62 carried by the body 7, the flap being arranged so that it is pushed outwardly and closes behind the sandwich and prevents defrauding by means of wires or tools inserted through the exit slot in the machine.

The dispensing member 11 is provided with means as flaps 63, Figs. 3 and 4, depending from the front face thereof which engage the rear face of the sandwich when the dispensing member is shoved backwardly and push the sandwich out through the mouth 10 of the unit.

What I claim is:

1. In a dispensing machine, a magazine for the articles to be dispensed, a dispensing member reciprocally movable and having a rack associated therewith, means for feeding the articles from the dispensing member comprising a gear connected to said mechanism and meshing with the rack and a one way clutch mechanism operating to transfer the motion of the dispensing member to the pinion during movement of the dispensing member in one direction, substantially as and for the purpose specified.

2. In a dispensing machine, the combination of a casing including a body and a cover, a magazine for the articles to be dispensed having its delivery end located in the casing, a dispensing member carried by the cover and movable across the end of the magazine, means for feeding the articles to the magazine into a position in front of the dispensing member, said means being carried by the body, and power transmitting connections between the dispensing member and said mechanism, including parts separable during the opening of the cover, substantially as and for the purpose described.

3. In a dispensing machine, the combination of a casing including a body and a cover, a magazine for the articles to be dispensed having its delivery end located in the casing, a dispensing member carried by the cover and movable across the end of the magazine, means for feeding the articles to the magazine into a position in front of the dispensing member, said means being carried by the body, and power transmitting connections between the dispensing member and said mechanism, including intermeshing toothed members carried by the cover and the body respectively and separable during the opening of the cover, substantially as and for the purpose specified.

4. In a dispensing machine, a casing including a body and a portion depending from the body, a cover for the body, a magazine for the articles to be dispensed movable endwise into the depending portion and removable endwise through the top of the body when the cover is open and mechanism including parts located in the casing and parts carried on the under side of the cover and normally arranged over the upper ends of the magazine and preventing removal of the magazine, said parts carried by the cover being displaced upon lifting of the cover, substantially as and for the purpose described.

5. In a dispensing machine, a casing including a body, and a portion depending from the body, guides extending into casing, a magazine for the articles to be dispensed movable endwise of the guides and removable by an endwise movement through the top of the casing from the guides and dispensing mechanism located in the casing and including a follower movable in the guides and in the magazine through the bottom thereof, and delivery parts carried by the cover and movable across the upper end of the magazine and normally preventing endwise displacement thereof, said dispensing parts being movable with the cover to permit displacement of the magazine, substantially as and for the purpose specified.

6. In a dispensing machine, a casing including a body, and a portion depending from the body, guides extending into the casing, a magazine for the articles to be dispensed movable endwisely into the guides and removable through the top of the casing from the guides, the magazine having an open bottom and means at its lower end for temporarily supporting the articles, the magazine terminating short of the end of the casing providing a space beyond the end of the magazine, and dispensing mechanism located in the casing and including a follower movable in the guide and in the magazie through the bottom thereof from said space and past said means, substantially as and for the purpose described.

7. In a dispensing machine, a casing including a body, and a cover for the body, and a portion depending into the body, a magazine for the articles to be dispensed movable endwisely in the depending portion and removable through the top of the body when the cover is open and dispensing mechanism located in the casing and including parts carried by the body and parts carried by the cover and connections between the parts carried by the cover and the body, said parts being separable upon opening movement of the cover, substantially as and for the purpose described.

In testimony whereof, I have hereunto signed by name, at Rochester, in the county of Monroe, and State of New York, this 22nd day of June, 1917.

WILLIAM R. TUTTLE.